United States Patent [19]

Bachus

[11] Patent Number: 5,760,150
[45] Date of Patent: Jun. 2, 1998

[54] COPOLYMERIZATES OF UNSATURATED CARBOXYLIC ACIDS, PROCESS FOR THE PREPARATION THEREOF AND USE THEREOF

[75] Inventor: Herbert Bachus, Hechingen, Germany

[73] Assignees: TH. Goldschmidt AG, Essen; CHT R. Beitlich GmbH, Tubingen, both of Germany

[21] Appl. No.: 666,368

[22] PCT Filed: Nov. 22, 1994

[86] PCT No.: PCT/EP94/03846

§ 371 Date: Sep. 30, 1996

§ 102(e) Date: Sep. 30, 1996

[87] PCT Pub. No.: WO95/17442

PCT Pub. Date: Jun. 29, 1995

[30] Foreign Application Priority Data

Dec. 23, 1993 [DE] Germany ............ 43 44 029.0

[51] Int. Cl.⁶ .............. C08F 220/04; C08F 228/00; C08F 222/02; C11D 3/37
[52] U.S. Cl. ............ 526/238.23; 526/287; 526/318.2; 526/317.1; 252/174.24
[58] Field of Search ............ 526/238.23, 287, 526/317.1, 318.2, 174.24

[56] References Cited

U.S. PATENT DOCUMENTS

| | | |
|---|---|---|
| 4,916,178 | 4/1990 | Amati et al. |
| 4,963,157 | 10/1990 | Machida et al. |
| 4,963,629 | 10/1990 | Driemel et al. |

FOREIGN PATENT DOCUMENTS

| | | |
|---|---|---|
| 289895 | 11/1988 | European Pat. Off. |
| 364681 | 4/1990 | European Pat. Off. |
| 510331 | 10/1992 | European Pat. Off. |
| 2211578 | 5/1975 | Germany. |
| 2926098 | 1/1980 | Germany. |
| 2444823 | 5/1982 | Germany. |
| 3714732 | 11/1988 | Germany. |
| 3834237 | 4/1990 | Germany. |
| 4208106 | 9/1992 | Germany. |
| 4113003 | 10/1992 | Germany. |
| 4203797 | 8/1993 | Germany. |
| WO 9401476 | 1/1994 | WIPO. |

*Primary Examiner*—Joseph L. Schofer
*Assistant Examiner*—Wu C. Cheng
*Attorney, Agent, or Firm*—Baker & Botts LLP

[57] ABSTRACT

The present invention relates to copolymerizates (A) of unsaturated carboxylic acids, selected from carboxylic acids containing sulfonic acid groups, comonomer mixtures of carboxylic acids containing sulfonic acid groups with dicarboxylic acids, and comonomer mixtures of carboxylic acids containing sulfonic acid groups and/or dicarboxylic acids and their anhydrides, with other unsaturated compounds, in particular monoethylenically unsaturated monocarboxylic acids containing from 3 to 10 carbon atoms. Another embodiment of the invention comprises a process for the preparation of said copolymerizates (A), a mixture of copolymerizates (A) with analogous copolymerizates (B), as well as the use of the above copolymerizates and their mixtures as sequestering agents, complexing agents and co-builders in detergent and cleaning agent industry and as textile treatment aids.

34 Claims, No Drawings

COPOLYMERIZATES OF UNSATURATED CARBOXYLIC ACIDS, PROCESS FOR THE PREPARATION THEREOF AND USE THEREOF

The present invention relates to copolymerizates of unsaturated carboxylic acids and other unsaturated compounds, mixtures thereof with other copolymerizates of unsaturated carboxylic acids with other unsaturated compounds, and the use of said copolymerizates as textile treatment aids and in detergents and cleaning agents.

Complexing agents and dispersants are needed in amounts of many a thousand tons in the areas of textile industry as well as detergent and cleaning agent industry and after use find their way to the waste water.

In the prior art, aminopolycarboxylic acids have been frequently used, such as aminocarboxylic acids, phosphonic acids, and polyacrylic acids. The use of such compounds, however, has significant ecological drawbacks:

The aminocarboxylic acids currently employed are difficult to eliminate from waste water and, with the exception of NTA which is but insufficiently active in many processes, are hardly biodegradable.

The polyacrylic acids which are often employed currently, although capable of being eliminated by adsorption to sewage sludges, are not biodegradable.

Phosphonic acids are but slowly biodegradable in the laboratory test, they are, however, rapidly degraded in environmentally relevant concentrations by hydrolysis and photolysis ("Environmental Properties and Safety Assessment of Organic Phosphonates Use of Detergent and Water Treatment Applications" by W. E. Gledhill and T. C. J. Feijtel in "The Handbook of Environmental Chemistry", Volume 3, part F, Springer-Verlag 1992, pages 261–285). In addition, these phosphonates can be biologically eliminated by adsorption to sewage sludge and, in contrast to the classical complexing agents, EDTA or DTPA, have no remobilisation potential for toxic heavy metals, such as cadmium and mercury. Nevertheless, this class of substances too is often undesirable for the mere reason of their phosphorus content, or their use is restricted by legal regulations.

It is therefore desirable for environmental reasons to synthesize and employ in practice complexing and dispersing compounds without the drawbacks of classical complexing agents. The object is to use renewable raw materials, such as monosaccharides or polysaccharides, as starting materials for synthesizing adequately biodegradable dispersants, in particular based on organic carboxylic acids.

DE-24 22 823 B2 describes the use of polyacrylic acids for dyeing cellulose fibers. DE-29 26 098 A1 describes polyacrylic acids for aftertreatment agents in dyeing with reactive dyes for the purpose of improving the washability of unfixed dye hydrolysates. U.S. Pat. No. 4,916,178 A describes polyacrylic acids, U.S. Pat. No. 4,963,157 A describes the combination of polyacrylic acids with phosphonic acids for the use in hydrogen peroxide bleaches. These laid-open and patent specifications disclose polyacrylic acids (in U.S. Pat. No. 4,963,157 A in combination with phosphonic acids) which are not biodegradable.

DE-42 03 797 A1 describes hydrogen peroxide stabilizers for hydrogen peroxide textile bleaches consisting of magnesium ions, gluconic acid and nitrilotriacetic acid which may further contain citric acid. Hardly biodegradable ethylenediaminetetraacetic acid and phosphorus-containing products, which may be used, optionally in combination with gluconic acid, as hydrogen peroxide stabilizers according to DE-22 11 578 B2 with and without water glass, are dispensed with. DE-42 08 106 A1 describes compositions of citric acid, sugar acids, such as gluconic acid, and optionally a small amount of mineral acid for the pretreatment of textile fiber materials. DE-41 13 003 A1 and EP 0 510 331 A2 describe proteins, protein hydrolysates and carboxymethylated protein hydrolysates, also for the stabilization of hydrogen peroxide. Although DE-42 03 797 A1, DE-42 08 106 A1, DE-41 13 003 A1 and EP 0 510 331 A2 disclose biodegradable mixtures, these formulations lack the dispersing properties known from polyacrylates.

From EP 0 289 895 A2, there is known the preparation of copolymerizates of acrylic acid with glucose which are characterized by high calcium binding capacities and good biodegradability. EP 0 364 681 describes corresponding compounds based on disaccharides, namely leucrose and palatinose.

It has now surprisingly been found that the copolymerizates known from EP 0 289 895 A2 and EP 0 364 681 as well as especially selected, yet unknown copolymerizates can be used as dispersants or sequestering agents for many textile treatment processes.

In particular, it has been found that the properties of the products can be further optimized, as compared to the prior art, by using novel monomeric building blocks, e.g. dicarboxylic acids, such as maleic acid, and/or sulfonic acid containing monomers, such as 2-acrylamido-2-methyl-1-propanesulfonic acid.

In a first embodiment, the invention comprises copolymerizates (A) of unsaturated carboxylic acids with other unsaturated compounds, obtainable by reacting solutions of enolate-forming monosaccharides and/or disaccharides with unsaturated carboxylic acids in the presence of free-radical providing initiators, characterized in that said unsaturated carboxylic acids are selected from carboxylic acids containing sulfonic acid groups, comonomer mixtures of carboxylic acids containing sulfonic acid groups with dicarboxylic acids, and comonomer mixtures of carboxylic acids containing sulfonic acid groups and/or dicarboxylic acids and their anhydrides with monoethylenically unsaturated monocarboxylic acids containing from 3 to 10 carbon atoms.

According to the invention, it has been found that the unsaturated carboxylic acids which are especially selected from carboxylic acids containing sulfonic acid groups and comonomer mixtures of carboxylic acids containing sulfonic acid groups and/or dicarboxylic acids and their anhydrides with the monoethylenically unsaturated monocarboxylic acids have improved product properties as compared to the prior art. There may be mentioned, in particular, the liquor test with vat dye in which compositions with maleic acid and optionally, in addition, 2-acrylamido-2-methyl-1-propanesulfonic acid can retain the dye homogenically in solution and yield only a little filter residue whereas copolymerizates without maleic acid cannot. Also, the improved dispersing action of calcium carbonate can be seen according to the invention. This result is all the more surprising since compositions with maleic acid do not result in higher calcium binding capacities.

These copolymerizates (A) according to the invention contain enolate-forming monosaccharides and/or disaccharides. Aqueous solutions of these compounds are relatively stable under the conditions of the invention and will not or but slightly discolor as long as the polymerization or copolymerization with the unsaturated carboxylic acids is still taking place. Only when the unsaturated carboxylic acids have disappeared from the solution by polymerization, the usual decomposition and discoloring of the saccharide solutions begins which can take place already at pH values of above 4.

Preferably, the copolymerizates according to the present invention contain enolate-forming monosaccharides and/or disaccharides selected from glucose, fructose, mannose, maltose, xylose, galactose, palatinose, and leucrose.

The copolymerizates (A) can be divided, in principle, in five different groups. A common feature of these is the presence of the enolate-forming monosaccharides and/or disaccharides.

A first group of copolymerizates (A) is characterized by containing unsaturated carboxylic acids which are selected from carboxylic acids containing sulfonic acid groups alone. The use of such unsaturated carboxylic acids has been unknown in the prior art of the present field.

A second group of copolymerizates (A) comprises comonomer mixtures of the carboxylic acids containing sulfonic acid groups mentioned above with dicarboxylic acids and anhydrides of dicarboxylic acids.

The third group of copolymerizates (A) comprises binary comonomer mixtures of the carboxylic acids containing sulfonic acid groups with monoethylenically unsaturated monocarboxylic acids containing from 3 to 10 carbon atoms.

The forth of the above mentioned groups of copolymerizates (A) in addition comprises ternary comonomer mixtures of carboxylic acids containing sulfonic acid groups, dicarboxylic acids and their anhydrides, and in addition monoethylenically unsaturated monocarboxylic acids containing from 3 to 10 carbon atoms.

A fifth group of copolymerizates (A) in addition comprises comonomer mixtures of dicarboxylic acids and their anhydrides with monoethylenically unsaturated monocarboxylic acids containing from 3 to 10 carbon atoms.

It has been found according to the invention that particularly good results are obtained when the carboxylic acid containing sulfonic acid groups is 2-acrylamido-2-methyl-1-propanesulfonic acid. The use of the above mentioned sulfonic acids shows particular advantages with respect to the prior art in calcium binding capacity and in the vat liquor test.

The dicarboxylic acids, per se known in the prior art (as a sole monomeric building block), are preferably selected from maleic acid, fumaric acid and/or itaconic acid and their anhydrides if they exist.

From the prior art, it is known that monoethylenically unsaturated monocarboxylic acids containing from 3 to 10 carbon atoms in copolymerizates with enolate-forming monosaccharides and/or disaccharides impart special properties, as sequestering agents, complexing agents and co-builders, to detergents and cleaning agents. Accordingly, the monoethylenically unsaturated monocarboxylic acids according to the present invention are also preferably selected from acrylic acid and/or methacrylic acid.

In the above mentioned groups of copolymerizates (A), the molar ratio in the comonomer mixtures of carboxylic acid containing sulfonic acid groups to dicarboxylic acids of the second group is adjusted in the range of from 95:5 to 5:95 mole percent. In the same way, the molar ratio of the third group of copolymerizates (1), i.e. the molar ratio of the carboxylic acid containing sulfonic acid groups to the monoethylenically unsaturated monocarboxylic acids containing from 3 to 10 carbon atoms, can be adjusted in the range of from 95:5 to 5:95 mole percent. With the ternary comonomer mixtures of the forth group of copolymerizates (A), it is also preferred to adjust the molar ratio of the carboxylic acid containing sulfonic acid groups to dicarboxylic acids and monoethylenically unsaturated monocarboxylic acids containing from 3 to 10 carbon atoms in the range of from 95:2.5:2.5 to 2.5:95:2.5 or to 2.5:2.5:95 mole percent. In the case of the binary mixtures of dicarboxylic acids and their anhydrides with monoethylenically unsaturated monocarboxylic acids containing from 3 to 10 carbon atoms of the fifth group of the copolymerizates (A), the molar ratio is preferably adjusted in the range of from 95:5 to 5:95 mole percent.

The general procedure for preparing copolymerizates (A) is known, in principle, from the prior art and in particular from EP-0 289 895 A2 and EP-0 364 681 A2. Thus, the copolymerizates (A) according to the invention can also be obtained by adding to the solution of the enolate-forming monosaccharide and/or disaccharide said carboxylic acids containing sulfonic acid groups, dicarboxylic acids and their anhydrides, and monoethylenically unsaturated monocarboxylic acids, independently depending on the reaction product desired, and the free-radical providing initiator, followed by slowly heating the reaction mixture. As a rule, the reaction will start above 60° C. and then will often become so vigorous that the temperature will increase above 110° C. This should be avoided, if possible, since undesirably strong decomposition of the sugar not yet incorporated in the copolymerizate (A) may occur. It is particularly preferred to perform the reaction for 0.5 h to 10 h, more preferably for 2 h to 4 h. As the free-radical providing initiator, organic and/or inorganic peroxides and hydrogen peroxide are preferably used.

It is particularly preferred, according to the invention, to adjust the pH value of the reaction within a range of from 5 to 10, in particular from 7 to 10, i.e. a slightly acidic or alkaline pH range.

The copolymerizates according to the invention can be removed from the reaction mixture in a per se known and simple manner, namely by simple acidification whereby they are precipitated or will form a separate phase.

The acidified mother liquors primarily contain unreacted monosaccharides and/or disaccharides. These may optionally be recovered and reused.

In addition, it has also been found that physical mixtures of copolymerizates (A) as described above with per se known copolymerizates (B), such as known, for instance, from EP-0 289 895 A2 and EP-0 364 681 A2, will give extraordinarily good results. Correspondingly, another embodiment of the present invention consists of mixtures of copolymerizates (A) of unsaturated carboxylic acids and other unsaturated compounds, obtainable by reacting solutions of enolate-forming monosaccharides and/or disaccharides with unsaturated carboxylic acids in the presence of free-radical providing initiators, said unsaturated carboxylic acids being selected from carboxylic acids containing sulfonic acid groups, comonomer mixtures of carboxylic acids containing sulfonic acid groups with dicarboxylic acids, and comonomer mixtures of carboxylic acids containing sulfonic acid groups and/or dicarboxylic acids and their anhydrides with ethylenically unsaturated monocarboxylic acids containing from 3 to 10 carbon atoms, with copolymerizates (B) of unsaturated carboxylic acids and other unsaturated compounds, obtainable by reacting solutions of enolate-forming monosaccharides with unsaturated carboxylic acids, especially those containing from 3 to 10 carbon atoms, in the presence of free-radical providing initiators.

The weight ratio of copolymerizates (A) to copolymerizates (B) is set, in particular, within the range of from 99:1 to 1:99 parts by weight, preferably within the range of from 20:80 to 50:50 parts by weight.

In addition, the product classes according to the invention can be formulated by mixing with other readily biodegradable complexing agents, such as gluconic acid, NTA, citric acid and tartaric acid, to give phosphorus-free, readily biodegradable complexing agents. Also useful are mixtures with protein, such as casein, protein hydrolysates, or polyphosphates which can improve the dispersing action and dirt-suspending properties of polyacrylates and, being heavy metal complexing agents, can also increase the stabilizing effect in alkaline hydrogen peroxide bleaches.

Correspondingly, another embodiment of the present invention consists of mixtures containing copolymerizates (A) and/or copolymerizates (B) in the presence of inorganic and/or organic, in particular biodegradable, substances, in particular complexing agents, proteins and protein hydrolysates, magnesium salts, and/or stabilizers for peroxy compounds.

The substances used according to the present invention are preferably selected from finely crystalline, synthetic or natural, zeolites containing bound water, alkali metal and/or ammonium salts of monocarboxylic and polycarboxylic acids, in particular gluconic acid, nitrilotriacetic acid, citric acid and tartaric acid, as well as alkali metal and/or ammonium pyrophosphates, tripolyphosphates and higher condensed polyphosphates with a total phosphorus content of the final formulation of less than or equal to 3% by weight. Particularly preferred is a weight ratio of copolymerizate to the substances mentioned of from 50:1 to 1:1 parts by weight, based on the mixtures. As the alkali metal cations, sodium and/or potassium ions are preferably used.

It has further been found that small contents of other complexing agents, in particular phosphonic acids, significantly further improve the properties of the copolymerizates according to the invention in textile applications. As phosphonic acids, there may be used, for example, aminotris (methylenephosphonic acid) (ATMP) and its N-oxide (ATMP-O), ethylenediaminetetrakis (methylenephosphonic acid) (EDTMP) and its N-oxides (EDTMP-O), diethylenetriaminepentakis (methylenephosphonic acid) (DTPMP) and its N-oxides (DTPMP-O), triethylenetetraminehexakis (methylenephosphonIc acid) (TTHMP) and its N-oxides (TTHMP-O), 2-phosphonobutane-1,2,4-tricarboxylic acid (PBTC), 1-hydroxyethane-1,1-diphosphonic acid (HEDP), and N-(2-carboxyethyl)-1-aminoethane-1,1-diphosphonic acid (CADP). Apart from the significantly increased effectiveness with simultaneous reduction of active ingredient by about 50%, these mixtures are also interesting because of the therefore halved pollution by chemical oxygen (CSB pollution). The examples impressively show optimum values of vat dyeing and calcium carbonate dispersion. Preferably, the mixtures according to the invention contain weight ratios of copolymerizate to phosphonic acid in the range of from 30:1 to 3:1 parts by weight.

In another preferred embodiment of the present invention, the above mentioned copolymerizates or mixtures contain magnesium salts, in particular those selected from magnesium oxide, magnesium hydroxide, magnesium sulfate and/or magnesium chloride, preferably in a weight ratio of copolymerizate to magnesium salt in the range of from 30:1 to 5:1 parts by weight.

In case the above mentioned copolymerizates and/or mixtures contain proteins or protein hydrolysates, these are preferably selected from casein and collagen, in particular in a weight ratio of copolymerizate to protein hydrolysate in the range of from 100:1 to 5:1 parts by weight.

Another embodiment of the present invention pertains to the use of the copolymerizates (A), the mixtures of copolymerizates (A) with copolymerizates (B), and copolymerizates (B) alone. According to the invention, it has been found surprisingly that the above mentioned copolymerizates, optionally in admixture with the above mentioned other components, are useful as textile treatment aids. In addition, copolymerizates (A) and the mixtures of copolymerizates (A) with copolymerizates (B) are particularly useful as sequestering agents, complexing agents and co-builders in detergents and cleaning agents.

In another preferred embodiment of the present invention, the above mentioned copolymerizates and mixtures thereof are used in the alkaline decoction of cotton, in acid demineralization processes, especially with subsequent one-liquor hydrogen peroxide bleaching after pH change, in peroxyacetic acid bleaching, in fabric desizing, in water glass or water glass-free hydrogen peroxide bleaching, in dyeing processes, especially with reactive dyes or indanthrene dyes, in rewashing of dyeings and printings, as well as in washing processes in pretreatment and dyeing.

It is particularly preferred according to the present invention to use the above mentioned copolymerizates and their mixtures:

in water glass continuous hot bleaching at between 0.1 and 15 g/l, in particular between 2 and 10 g/l;

in water glass-free continuous hot bleaching at between 0.1 and 15 g/l, in particular between 2 and 10 g/l;

in water glass discontinuous hot bleaching at between 0.1 and 5 g/l, in particular between 0.2 and 3 g/l;

in water glass-free discontinuous hot bleaching at between 0.1 and 5 g/l, in particular between 0.2 and 5 g/l;

in water glass cold bleaching at between 0.1 and 15 g/l, in particular between 2 and 10 g/l;

in water glass-free cold bleaching at between 0.1 and 15 g/l, in particular between 2 and 10 g/l;

in continuous desizing at between 0.1 and 15 g/l, in particular between 2 and 10 g/l;

in discontinuous desizing at between 0.1 and 5 g/l, in particular between 0.2 and 5 g/l;

in reductive bleaching at between 0.1 and 15 g/l, in particular between 0.2 and 5 g/l;

in alkaline decoction at between 0.1 and 15 g/l, in particular between 0.2 and 5 g/l;

in dyeing processes at between 0.1 and 10 g/l, in particular between 0.3 and 4 g/l;

in soaping aftertreatment of dyeings at between 0.1 and 5 g/l, in particular between 0.5 and 2 g/l; and in washing processes at between 0.1 and 15 g/l, in particular between 0.2 and 5 g/l; respectively based on the product formulations which preferably have a dry substance content of from 15 to 60% by weight.

EXAMPLES

Example 1

(Preparation of a Copolymerizate According to EP-0 289 895 A2)

Solution 1: 108.1 g of acrylic acid was dissolved in 300 g of 20% aqueous sodium hydroxide.

Solution 2: 90.1 g of glucose was dissolved in 100 g of water and then 48.6 g of 35% hydrogen peroxide was added.

In a reaction vessel, 100 g of water were heated at 85° C. The two solutions were added dropwise in the course of 90 minutes. During the addition, the pH value was maintained constant at 9 by metering 50% aqueous sodium hydroxide. After the addition was complete, the mixture was maintained at 98° to 102° C. for another 30 minutes. Then, the mixture was cooled.

Example 2

A copolymerizate was prepared as in example 1, except that in addition 5.5 g of mercaptoethanol was added to solution 1.

Example 3

A copolymerizate was prepared as in example 1, except that instead of solution 1 the reaction mixture contained 100.9 g of acrylic acid and 20.7 g of 2-acrylamido-2-methyl-1-propanesulfonic acid dissolved in 300 g of 20% aqueous sodium hydroxide.

Example 4

A copolymerizate was prepared as in example 1, except that the reaction mixture contained Solution 1: 108.1 g of acrylic acid; period of addition 120 minutes;

Solution 2: 48.6 g of hydrogen peroxide; period of addition 120 minutes; and

Solution 3: 50% aqueous sodium hydroxide.

90.1 g of glucose was dissolved in 200 g of water and heated at 85° C. Then, solutions 1, 2 and 3 were metered in such that the pH value was kept constant at 8.7. After the addition was complete, stirring at 85° C. was continued for 30 minutes.

Example 5

A copolymerizate was prepared as in example 1, except that the reaction mixture contained Solution 1: 82.9 g of acrylic acid; period of addition 90 minutes;

Solution 2: 48.6 g of hydrogen peroxide; period of addition 120 minutes; and

Solution 3: 50% aqueous sodium hydroxide.

29.4 g of maleic anhydride was added to a mixture of 70 g of water and 48 g of 50% NaOH. After a homogeneous solution had been formed, 90.1 g of glucose was added and the solution heated at 85° C. Then, solutions 1, 2 and 3 were metered in such that the pH value was kept constant at 9. After the addition was complete, stirring at 85° C. was continued for 30 minutes.

Example 6

A copolymerizate was prepared as in example 5, except that the reaction mixture contained Solution 1: 10.4 g of AMPS, dissolved in 30 g of water, and 82.9 g of acrylic acid; period of addition 90 minutes;

Solution 2: 48.6 g of hydrogen peroxide; period of addition 120 minutes; and

Solution 3: 50% aqueous sodium hydroxide.

Example 7

A copolymerizate was prepared as in example 5, except that the reaction mixture contained Solution 1: 64.9 g of acrylic acid; period of addition 90 minutes;

Solution 2: 48.6 g of hydrogen peroxide; period of addition 120 minutes; and

Solution 3: 50% aqueous sodium hydroxide.

58.8 g of maleic anhydride was added to a mixture of 90 g of water and 96 g of 50% NaOH. After a homogeneous solution had been formed, 90.1 g of glucose was added and the solution heated at 85° C. Then, solutions 1, 2 and 3 were metered in such that the pH value was kept constant at 9. After the addition was complete, stirring at 85° C. was continued for 30 minutes.

Example 8

A copolymerizate was prepared as in example 7, except that the reaction mixture contained Solution 1: 64.9 g of acrylic acid; period of addition 210 minutes;

Solution 2: 48.6 g of hydrogen peroxide; period of addition 240 minutes; and

Solution 3: 50% aqueous sodium hydroxide.

58.8 g of maleic anhydride was added to a mixture of 90 g of water and 96 g of 50% NaOH. After a homogeneous solution had been formed, 90.1 g of glucose was added and the solution heated at 85° C. Then, solutions 1, 2 and 3 were metered in such that the pH value was kept constant at 6.0. After the addition was complete, stirring at 85° C. was continued for 30 minutes.

In case that concentration precipitations occurred with highly concentrated reaction mixtures, a stable solution was achieved by diluting with water at 70% of the initial concentration.

Examples 9 to 20

The following mixtures were prepared by adding to water the ingredients following the numbers of the examples in top to bottom order and a pH value of 9 was adjusted with either 31% hydrochloric acid or 50% aqueous sodium hydroxide, with the exception of examples 11, 19 and 20. While the pH value was left unchanged in example 11, it was adjusted at 5 in examples 19 and 20.

The following table 1 gives the amounts of the respective components. The formulations of examples 4, 5 and 6 were employed without further processing as obtained from the reaction. The other products were employed at a dry substance content of 10% unless another percentage or crystal water content is given. The quantity employed was 100 g in each case.

TABLE 1

| material used | example | | | | | | | | | | | |
|---|---|---|---|---|---|---|---|---|---|---|---|---|
| | 9 | 10 | 11 | 12 | 13 | 14 | 15 | 16 | 17 | 18 | 19 | 20 |
| example 4 | 30 | 30 | 30 | | | | | | | | | |
| example 5 | | | | 30 | 30 | 30 | | 30 | 30 | 30 | 15 | 15 |
| example 6 | | | | | | | 30 | | | | | |
| DTPMP[1] | 3 | | | 3 | | | | | | | 2 | |
| HEDP[2] | | 3 | | | 3 | | 3 | | | | | |
| ATMP-O[3] | | | | | | 3 | | | | | | |
| sodium gluconate | | | | | | | | 10 | | | | |
| NTA 40%[4] | | | | | | | | | 10 | | | 5 |
| citric acid.H$_2$O | | | | | | | | | | 10 | | |
| MgCl$_2$.6H$_2$O | | | | | | | | | | | 10 | 10 |
| gluconic acid 50% | | | | | | | | | | | 16 | 16 |
| Calgon 322 ® | | | 10 | | | | | | | | | |

[1] diethylenetriaminepentakis(methylenephosphonic acid)
[2] 1-hydroxyethane-1,1-diphosphonic acid
[3] aminotris(methylenephosphonic acid) N-oxide
[4] nitrilotriacetate Calcium binding capacity—turbidimetric titration p 1.0 g of the materials used according to the examples was dissolved in 100 ml of distilled water, the pH value was adjusted to 7 to 9 with 1M aqueous NaOH solution, and 10 ml of 2% Na$_2$CO$_3$ solution was added. A pH value of 11 was adjusted with NaOH, and titration was performed with 0.25M calcium chloride solution, while the pH value was kept constant. This turbidimetric titration was stopped by a light guide photometer at 67% of the initial transmission and the calcium binding capacity determined with this final point. The data obtained can be seen from the following table.

TABLE 2

| example | viscosity [mP · s, 20° C.] | dry substance [%] | CaCO₃ in mg/g of product | CaCO₃ in mg/g of dry substance |
|---|---|---|---|---|
| 1 | 175 | 43 | 253 | 588 |
| 2 | 65 | 39 | 305 | 782 |
| 3 | 100 | 33 | 713 | 2161 |
| 4 | 400 | 41 | 367 | 895 |
| 5 | 3360 | 51 | 400 | 784 |
| 6 | 1600 | 51 | 478 | 937 |
| 7 | 5800 | 49 | 278 | 567 |
| 8 | 1350 | 52 | 333 | 640 |
| 9 | | 18 | 154 | 856 |
| 10 | | 18 | 168 | 933 |
| 11 | | 26 | 132 | 508 |
| 12 | | 20 | 168 | 840 |
| 13 | | 20 | 147 | 735 |
| 14 | | 20 | 166 | 830 |
| 15 | | 20 | 154 | 770 |
| 16 | | 22 | 136 | 618 |
| 17 | | 17 | 138 | 1059 |
| 18 | | 25 | 164 | 656 |
| 19 | | 24 | 89 | 371 |
| 20 | | 23 | 74 | 322 |

Calcium dispersing capability—filter test

To 150 ml of distilled water were successively added 0.4 g of the materials used according to the examples, 20° dH of Ca (as calcium chloride, based on a final volume of 200 ml), 10° dH of Mg (as magnesium sulfate, hardness based on a final volume of 200 ml), 4 g of NaCl, 4 g of Na₂SO₄, and 4 g of Na₂CO₃ [° dH = German degree of hardness], it was stirred at room temperature for 10 minutes and then filled up with distilled water to give a total volume of 200 ml. This mixture was refluxed for 60 min and then filtered hot through a black filter. After drying, the filter was visually evaluated on a scale from 1 (without residue) to 6 (residue as with blank). The results are summarized in table 3.

Vat liquor test

Using Indanthrene Blue BC® as a dye which is sensitive to cotton accompanying substances, e.g. hardness, the effective sequestering of alkaline earth metals could be shown in a particularly impressive way. Raw cotton was decocted in acetic acid. The dye was dissolved in this liquor. At this point, when dispersing was insufficient, the dye would precipitate, its calcium salt being insoluble. As a result, a colored, homogeneous liquor was obtained with particularly effective materials according to the examples, or an unstable, two-phase liquor was obtained with inadequate products. Vat liquor homogeneity was evaluated according to the following scale:

a) homogeneous liquor: +;

b) colored liquor, but dye in part precipitated: ±;

c) dye precipitated, supernatant liquor colorless or almost colorless: –.

As another test, the liquor was sucked through a white filter wherein in the presence of good dispersants the dissolved dye will pass through the filter leaving almost no residue. After drying, the filter was visually evaluated on a scale from 1 (without residue) to 6 (residue as with blank). The results are summarized in table 3.

Evaluation of soaping agents for removing reactive dye hydrolysates

1. Preparation of the dye hydrolysate solution and subsequent dyeing 2.5 g/l of reactive dye was hydrolyzed by boiling with 10 g/l of soda for four hours. Subsequently, the hydrolysate was padded on cotton geveline (woven fabric), basis weight 110 g/m², with a liquor uptake of 80%, and dried at 120° C. for 4 minutes.

As the dye, there was used:

Dyeing 1: 2.0 g/l of C.I. Reactive Red 120, and 0.5 g/l of C.I. Reactive Yellow 84, or Dyeing 2: 2.5 g/l of C.I. Reactive Blue 71

2. Washability test

Destilled water was adjusted to a hardness of 5° dH by addition of calcium chloride and a pH value of 7 with 0.1M aqueous sodium hydroxide or 0.1M hydrochloric acid. Then, at a liquor ratio of 1:30, the geveline dyed with dye hydrolysate and an undyed accompanying material of the same quality were washed at 98° C. in a Linitest in the presence of 2 g/l of aids for 15 minutes without intermediary rinsing. Visual evaluation was performed on the following scale:

Coloring of the washing liquor: the darker, the better

Bleeding of the dyed geveline: the lighter, the better (blank value 6, colorless 1)

Bleeding of the accompanying material: the lighter, the better

The results are summarized in table 3.

TABLE 3

| test | vat liquor homogeneous | vat liquor filter | CaCO₃ standard | soaping dyeing 1 | soaping dyeing 2 |
|---|---|---|---|---|---|
| blank value | – | 6 | 6 | 6 | 6 |
| example 1 | – | 5 | 4 | 3 | 4 |
| 2 | – | 5 | 4 | 3 | 4 |
| 3 | – | 5 | 3 | 3 | 4 |
| 4 | – | 5 | 4 | 3 | 4 |
| 5 | – | 5 | 4 | 5 | 4 |
| 6 | + | 3 | 3 | 3 | 4 |
| 7 | + | 3 | 3 | 3 | 4 |
| 8 | + | 2 | 2 | 3 | 4 |
| 9 | ± | 2 | 3 | 4 | 4 |
| 10 | + | 2 | 2 | 4 | 5 |
| 11 | – | 5 | 4 | 3 | 3 |
| 12 | ± | 2 | 2 | 4 | 4 |
| 13 | + | 1 | 4 | 3 | 3 |
| 14 | + | 1 | 3 | 3 | 3 |
| 15 | + | 1 | 2 | 4 | 3 |

When a degree of whiteness is given in the following, then Berger units were calculated by means of Datacolor white measurement.

Example A: Pad steam bleaching with water glass

The following liquor was padded onto a raw cotton tissue:

0.2 g/l of bitter salt, 5 ml/l of an anionic detergent (Lavotan® DSU), 5 g/l of a low-affinity optical brightener (Tuboblanc® BE 1.) 8 g/l of 100% NaOH, 10 ml/l of water glass 38° Bé, 30 ml/l of 35% hydrogen peroxide, and 5 g/l of the copolymerizate of example 1, liquor uptake 100%.

The good was treated according to the pad steam method at 102° C. for 30 minutes, washed, rinsed and dried. A perfectly bleached and brightened tissue resulted. The basic white increased from 22 to 85 units and fluorescence was 72.

Example B: Pad steam bleaching without water glass and without optical brightener Raw cotton was treated with 5 ml/l of the detergent mentioned in example A, 16 g/l of 50% aqueous sodium hydroxide, 30 ml/l of 35% hydrogen peroxide, and 10 g/l of the copolymerizate of example 20, liquor uptake 100%. The good thus bleached could be used without difficulty in a subsequent dyeing process.

Example C: Cold bleaching

A raw cotton tissue was impregnated with the following liquor:

0.2 g/l of bitter salt, 5 ml/l of the detergent mentioned in example A, 30 g/l of 50% aqueous sodium hydroxide, 10 ml/l of water glass 38° Bé, 40 ml/l of 35% hydrogen peroxide, and 5 g/l of the copolymerizate of example 17, liquor uptake 100%.

Thereafter, according to the KKV process, the good was kept at room temperature for 24 hours, then washed, rinsed and dried.

Example D: Discontinuous bleaching

Raw cotton tricot was treated in the following liquor at 98° C. at a liquor ratio of 1:10 for 30 minutes: 4 g/l of 50% aqueous sodium hydroxide, 8 ml/l of 35% hydrogen peroxide, 0.5 g/l of an anionic, low-foaming detergent (Lavotan® RWS), and 2 g/l of the copolymerizate mixture of example 13. Then, washing was performed and the degree of whiteness measured. The latter increased from 25 to 81 units.

Example E: Desizing

A raw cotton tissue, sized with starch, was impregnated at 40° C. with the following liquor: 5 g/l of an amylase (Beisol® LZV), 5 ml/l of the detergent mentioned in example A, and 5 g/l of the copolymerizate mixture 12. Washing was performed after four hours. The TEGEWA degree of desizing was 9.

Example F: Reductive bleaching

A prebleached cotton tissue was treated at 60° C. at a liquor ratio of 1:15 for 45 minutes in a liquor composed as follows: 1 g/l of the copolymerizate of example 4, 2 ml/l of the detergent mentioned in example A, and 5 g/l of a commercial hydrogen sulfite based bleaching agent. The degree of whiteness increased from 78 to 84 units.

Example G: Alkaline Decoction

Raw cotton tissue was decocted at 98° C. at a liquor ratio of 1:10 in the presence of 3 g/l of the copolymerizate mixture of example 9 and 20 g/l of 100% NaOH for 30 min. The degree of whiteness of the good increased from 22 to 37 and the ashes content decreased to 27% of the initial value. Without the aid, there was only obtained a degree of whiteness of 31 and a residual ashes of 34%.

Example H: Dyeing with direct dyes in a decoction process

Prebleached cotton tricot was treated in the following liquor on a Jet at a liquor ratio of 1:10: 1 g/l of a surfactant (Subitol® RNC), 1 g/l of the copolymerizate of example 13, 0.3 g/l of an anti-wrinkle agent (Biavin® 109), and 1 g/l of an equalizer (Sarabid® SBF). After 10 minutes, the direct dye, 1% C.I. Direct Green 26, was added followed by heating at 98° C. After 30 minutes, 10 g/l of Glauber salt was added in small portions, followed by rinsing after another 30 minutes. The good thus dyed was ready for cationic aftertreatment.

Example I: Dyeing with vat dyes on a dye back

Prebleached cotton tricot was treated according to the decoction process with the following liquor at a liquor ratio of 1:15: 3 g/l of the copolymerizate of example 12, 0.3 g/l of the anti-wrinkle agent mentioned in example H, 1 g/l of a dye dispersant (CHT dispersant SMS), 1% of vat dye C. I. Vat Green 1, and 15 ml/l of aqueous sodium hydroxide 38° Bé. After 10 minutes, the liquor was heated to 60° C., and 6 g/l of hydrogen sulfite was added. After another 35 minutes, another 2 g/l of aqueous sodium hydroxide 38° Bé, and 2 g/l of hydrogen sulfite were added, and 10 minutes later, overflow rinsing was performed. At 25° C., another 1 g/l of dye dispersant and 2 g/l of an oxidant (Meropan® XRG) were added. This was followed by heating at 60° C., oxidizing at 60° C. for 20 minutes, rinsing, addition of another 2 g/l of the copolymerizate of example 12, and soaping at 98° C. for 20 minutes. After draining and rinsing, the good was ready for reviving.

It was of particular advantage here to use the copolymerizate of example 12 since its complexing and dispersing properties obviated the need for employing different phosphonate and polyacrylate containing products for dyeing and soaping.

Example K: Dyeing with reactive dyes

Prebleached cotton tricot was treated according to the decoction process on a Jet with the following liquor at a liquor ratio of 1:10: 1 g/l of the copolymerizate of example 7, 0.3 g/l of the anti-wrinkle agent mentioned in example H, 1 g/l of a surfactant (Subitol® RNC), and 3% of C.I. Reactive Red 141. Dyeing was performed for 10 minutes in order to ensure a uniform dye distribution, then 70 g/l of sodium chloride was added in three portions (10%, 30%, and 60%) while the temperature was increased at 80° C. After 20 minutes at this temperature, 20 g/l of sodium carbonate was added in the course of 10 minutes, followed by further dyeing at this temperature for 60 minutes. After warm and cold rinsing, soaping was performed once by boiling with 2 g/l of the copolymerizate of example 7. The good thus dyed already has good wash fastness which can be still improved by cationic aftertreatment.

I claim:

1. A copolymer produced by free-radical initiated copolymerization of monomers comprising
    (a) enolate-forming monomers selected from the group consisting of enolate-forming monosaccharides and enolate-forming disaccharides; and
    (b) unsaturated carboxylic acid monomers selected from the group consisting of
        (i) carboxylic acids containing sulfonic acid groups;
        (ii) a mixture of carboxylic acids containing sulfonic acid groups and dicarboxylic acids;
        (iii) a mixture of carboxylic acids containing sulfonic acid groups with monoethylenically unsaturated monocarboxylic acids containing from 3 to 10 carbon atoms;
        (iv) a mixture of dicarboxylic acids and their anhydrides with monoethylenically unsaturated monocarboxylic acids containing from 3 to 10 carbon atoms; and
        (v) a mixture of carboxylic acids containing sulfonic acid groups and dicarboxylic acids and their anhydrides with monoethylenically unsaturated monocarboxylic acids containing from 3 to 10 carbon atoms.

2. A mixture of copolymers comprising a first copolymer according to claim 1; and
    a second copolymer produced by free-radical initiated copolymerization of monomers comprising enolate-forming monosaccharides and unsaturated carboxylic acids.

3. A textile treatment aid comprising a copolymer according to claim 1, or a copolymer produced by free-radical initiated copolymerization of monomers comprising enolate-forming monosaccharides and unsaturated carboxylic acids.

4. A textile treatment aid comprising a mixture according to claim 2.

5. The copolymer according to claim 1, characterized in that the enolate-forming monosaccharides and enolate-forming disaccharides are selected from glucose, fructose, mannose, maltose, xylose, galactose, palatinose, and leucrose.

6. The copolymer according to claim 1, characterized in that the carboxylic acid containing sulfonic acid groups is 2-acrylamido-2-methyl-1-propanesulfonic acid.

7. The copolymer according to claim 1, characterized in that the dicarboxylic acids are selected from maleic acid, fumaric acid and itaconic acid.

8. The copolymer according to claim 1, characterized in that the monethylenically unsaturated monocarboxylic acids are selected from acrylic acid and methacrylic acid.

9. The copolymer according to claim 1, characterized in that the molar ratio in the mixtures of carboxylic acid containing sulfonic acid groups with dicarboxylic acids and their anhydrides is adjusted in the range of from 95:5 to 5:95 mole percent, the molar ratio of carboxylic acids containing sulfonic acid groups with monoethylenically unsaturated monocarboxylic acids containing from 3 to 10 carbon atoms is adjusted in the range of from 95:5 to 5:95 mole percent, the molar ratio of the mixture of carboxylic acids containing sulfonic acid groups and dicarboxylic acids and their anhydrides with monethylenically unsaturated monocarboxylic acids is adjusted in the range of from 95:2.5:2.5 mole percent to 2.5:95:2.5 mole percent or to 2.5:2.5:95 mole percent, or the molar ratio of the mixture of dicarboxylic acids with monethylenically unsaturated monocarboxylic acids containing from 3 to 10 carbon atoms is adjusted in the range of from 95:5 to 5:95 mole percent.

10. A process for the preparation of the copolymer according to claim 1, wherein a solution of enolate-forming monomers selected from the group consisting of monosaccharides and disaccharides is reacted with unsaturated carboxylic acids in the presence of free-radical providing initiators selected from the group consisting of organic peroxides inorganic peroxides, and hydrogen peroxide.

11. The process according to claim 10, characterized in that the reaction is performed at a temperature of from 60° to 110° C. for from 0.5 to 10 h.

12. The process according to claim 10, characterized in that the pH value of the reaction is adjusted within a range of from 5 to 10.

13. The mixture according to claim 2, characterized in that the weight ratio of the first and second polymers is in the range of from 20:80 to 50:50 parts.

14. The mixture according to claim 13, characterized in that the at least one substance is selected from finely crystalline, synthetic or natural, zeolites containing bound water, alkali metal or ammonium salts of monocarboxylic and polycarboxylic acids, alkali metal or ammonium pyrophosphates, alkali metal or ammonium tripolyphosphates and higher condensed polyphosphates, the mixture having a total phosphorus content of the final formulation of less than or equal to 3% by weight.

15. The mixture according to claim 14, characterized in that the stabilizers for peroxy compounds are phosphonic acids.

16. The mixture according to claim 15, characterized in that the magnesium salts are selected from magnesium oxide, magnesium hydroxide, magnesium sulfate and magnesium chloride.

17. The mixtures according to claim 16, characterized in that the protein is casein or the protien hydrolysate is collagen hydrolysate, and the weight ratio of copolymer to protein or protein hydrolysate is in the range of from 30:1 to 1:1 parts by weight.

18. The detergent or cleaning aid according to claim 17, wherein the detergent or cleaning aid is suitable for use in alkaline decoction of cotton, in acid demineralization processes, in acid demineralization processes with subsequent one-liquor hydrogen peroxide bleaching after pH change, in peroxyacetic acid bleaching, in fabric desizing, in water glass-containing hydrogen peroxide bleaching, in water glass-free hydrogen peroxide bleaching, in dyeing processes, in dyeing processes with reactive dyes or indanthrene dyes, in rewashing of dyeings and printings, or in washing processes in pretreatment and dyeing.

19. The textile treatment aid according to claim 18, wherein the textile treatment aid is suitable for use in water glass or water glass-free continuous hot bleaching at between 0.1 and 15 g/l; in water glass or water glass-free discontinuous hot bleaching at between 0.1 and 5 g/l; in water glass or water glass-free cold bleaching at between 0.1 and 15 g/l; in continuous desizing at between 0.1 and 15 g/l; in discontinuous desizing at between 0.1 and 5 g/l; in reductive bleaching at between 0.1 and 15 g/l; in alkaline decoction at between 0.1 and 15 g/l; in dyeing processes at between 0.1 and 10 g/l; in soaping aftertreatment of dyeings at between 0.1 and 5 g/l; and in washing processes at between 0.1 and 15 g/l, respectively based on the product formulations.

20. The process according to claim 10, characterized in that the reaction is performed at a temperature of from 80° to 100° C., for from 2 h to 4 h.

21. The process according to claim 10, characterized in that the pH value of the reaction is adjusted within a range of from 7 to 10.

22. The mixture according to claim 2, wherein the unsaturated carboxylic acid monomers of the second copolymer have from 3 to 10 carbon atoms.

23. The mixture according to claim 2, further comprising at least one substance selected from the group consisting of complexing agents, proteins, protein hydrolyzates, magnesium salts, and stabilizers for peroxy compounds.

24. The mixture according to claim 14, characterized in that the total phosphorus content is in a weight ratio of from 50:1 to 1:1 parts by weight.

25. The mixture according to claim 14, characterized in that the polycarboxylic acids are gluconic acid, nitrilotriacetic acid, citric acid or tartaric acid.

26. The mixture according to claim 15, characterized in that the phosphonic acids are selected from aminotris (methylenephosphonic acid) and its N-oxide, ethylenediaminetetrakis (methylenephosphonic acid) and its N-oxides, diethylenetriaminepentakis (methylenephosphonic acid) and its N-oxides, triethylenetetraminehexakis (methylenephosphonic acid) and its N-oxides, 2-phosphonobutane-1,2, 4-tricarboxylic acid, 1-hydroxyethane-1, 1-diphosphonic acid, and N-(2-carboxyethyl)-1-aminoethane-1, 1-diphosphonic acid.

27. The mixture according to claim 15, characterized in that the phospohnic acids are in a weight ratio of copolymerizate to phosphonic acid of from 30:1 to 3:1 parts by weight.

28. The mixtures according to claim 23, characterized in that the magnesium salts are in a weight ratio of copolymer to magnesium salt in the range of from 30:1 to 5:1 parts by weight.

29. A detergent or cleaning aid comprising a copolymer according to claim 1, the copolymer being a sequestering agent, a complexing agent or a co-builder.

30. A detergent or cleaning aid comprising a mixture according to claim 2, the mixture being a sequestering agent, a complexing agent or a co-builder.

31. The detergent or cleaning aid according to claim 30, wherein the detergent or cleaning aid is suitable for use in alkaline decoction of cotton, in acid demineralization processes, in acid demineralization processes with subsequent one-liquor hydrogen peroxide bleaching after pH change, in peroxyacetic acid bleaching, in fabric desizing, in water glass-containing hydrogen peroxide bleaching, in water glass-free hydrogen peroxide bleaching, in dyeing processes, in dyeing processes with reactive dyes or indanthrene dyes, in rewashing of dyeings and printings, or in washing processes in pretreatment and dyeing.

32. The textile treatment aid according to claim 3, wherein the textile treatment aid is suitable for use in water glass or water glass-free continuous hot bleaching at between 2 and 10 g/l; in water glass or water glass-free discontinuous hot bleaching at between 0.2 and 5 g/l; in water glass or water glass-free cold bleaching at between 2 and 10 g/l; in continuous desizing at between 2 and 10 g/l; in discontinuous desizing at between 0.2 and 5 g/l; in reductive bleaching at between 0.2 and 5 g/l; in alkaline decoction at between 0.2 and 5 g/l; in dyeing processes at between 0.3 and 4 g/l; in soaping after treatment of dyeings at between 0.5 and 2 g/l; and in washing processes at between 0.2 and 5 g/l, respectively based on product formulations having a dry substance content of from 15 to 60% by weight.

33. The textile treatment aid according to claim 4, wherein the textile treatment aid is suitable for use in water glass or water glass-free continuous hot bleaching at between 0.1 and 15 g/l; in water glass or water glass-free discontinuous hot bleaching at between 0.1 and 5 g/l; in water glass or water glass-free cold bleaching at between 0.1 and 15 g/l; in continuous desizing at between 0.1 and 15 g/l, in discontinuous desizing at between 0.1 and 5 g/l; in reductive bleaching at between 0.1 and 15 g/l; in alkaline decoction at between 0.1 and 15 g/l; in dyeing processes at between 0.1 and 10 g/l; in soaping after treatment of dyeings at between 0.1 and 5 g/l; and in washing processes at between 0.1 and 15 g/l, respectively based on the product formulations.

34. The textile treatment aid according to claim 4, wherein the textile treatment aid is suitable for use in water glass or water glass-free continuous hot bleaching at between 2 and 10 g/l; in water glass or water glass-free discontinuous hot bleaching at between 0.2 and 5 g/l; in water glass or water glass-free cold bleaching at between 2 and 10 g/l; in continuous desizing at between 2 and 10 g/l; in discontinuous desizing at between 0.2 and 5 g/l; in reductive bleaching at between 0.2 and 5 g/l; in alkaline decoction at between 0.2 and 5 g/l; in dyeing processes at between 0.3 and 4 g/l; in soaping after treatment of dyeings at between 0.5 and 2 g/l; and in washing processes at between 0.2 and 5 g/l, respectively based on product formulations having a dry substance content of from 15 to 60% by weight.

* * * * *